Jan. 6, 1931.   B. McDANIELS ET AL   1,787,636
ICE CUTTING MACHINE
Filed Jan. 6, 1926   4 Sheets-Sheet 2

Jan. 6, 1931.   B. McDANIELS ET AL   1,787,636
ICE CUTTING MACHINE
Filed Jan. 6, 1926   4 Sheets-Sheet 3

Jan. 6, 1931.  B. McDANIELS ET AL  1,787,636
ICE CUTTING MACHINE
Filed Jan. 6, 1926  4 Sheets-Sheet 4

Inventors
Bennett McDaniels
Wm. C. Brooks
By Dowell & Dowell
Attorneys

Patented Jan. 6, 1931

1,787,636

UNITED STATES PATENT OFFICE

BENNETT McDANIELS AND WILLIAM C. BROOKS, OF LOVELL, MAINE

ICE-CUTTING MACHINE

Application filed January 6, 1926. Serial No. 79,640.

This invention relates to machines used on lakes, ponds and rivers for cutting ice into blocks of suitable size and shape for packing in ice houses.

In order to prevent ice from melting over as long a period of time as possible, and for economy in space in packing in ice houses, close or compact packing is essential, and to this end it is highly important that the ice should be cut into blocks having square corners and smooth sides free from depressions or surface protuberances or projections which result from imperfect methods of cutting, rendering it necessary to break off the strips or blocks which are not completely severed by the cutters.

In ice cutting machines as heretofore constructed, rotary saws are used alternately, one for cutting a longitudinal strip or strips and the other for cutting the strips into blocks while the longitudinal strip-cutting saw is inactive, and the work done in this way is unsatisfactory because the circular saws do not completely sever the strips from the main body of ice or the blocks from the strips, thus rendering it necessary to use hand tools to break off the strip or block, and as a result the finished blocks are left with crevices or depressions or surface protuberances or projections which prevent close packing, and render it necessary, in the case of surface projections, to trim the rough edges caused by breaking, in order that the blocks may be closely packed.

The primary objects of our invention are to overcome the foregoing objections, which are incident to the use of machines as heretofore constructed using rotary saws, and to provide a motor-operated machine of the character referred to having reciprocating saws, one of which is used for cutting longitudinal strips or slabs of ice from a large body or field of ice over which the machine is drawn or propelled, and the other for simultaneously cutting the strips transversely of the direction or line of movement of the machine, so as to form blocks of suitable size and shape for packing without crevices or furrows which form air spaces that tend to hasten the melting of the ice, and without surface projections which prevent close packing and thereby shorten the period of time during which the ice may be kept from melting while in storage.

Another object is to provide a simple, efficient and durable ice cutting machine having reciprocating saws which operate simultaneously and continuously, except for the momentary period of time it takes to move the machine forward a sufficient distance to bring the cross-cut saw into proper position for cutting a cake or block of the desired length from the strip cut by the other saw; this being accomplished without stopping the operation of the strip-cutting saw and without stopping the reciprocating movement of either saw.

The invention will first be hereinafter more particularly described, with reference to the accompanying drawings, which are to be taken as a part of this specification, and then pointed out in the claims at the end of the description.

In said drawings.

Figs 7 and 8 are fragmentary detail views showing opposite sides of a manually-operated sliding block and associated parts connecting it with mechanically-operated clutch-controlling means;

Figure 4:
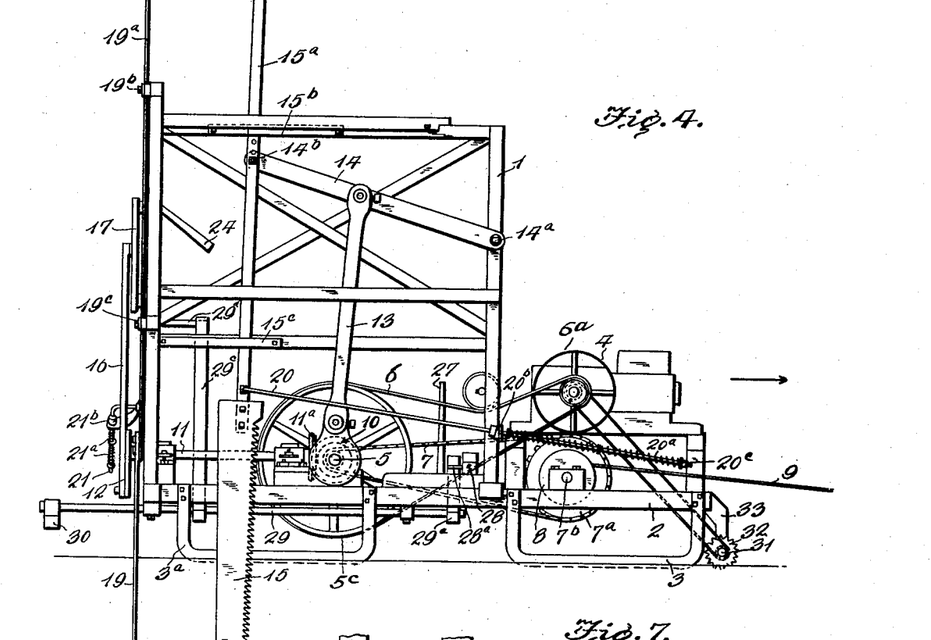
Fig. 4 is a side elevation of the machine, showing the strip-cutting saw in its normal position.
Figure 6:
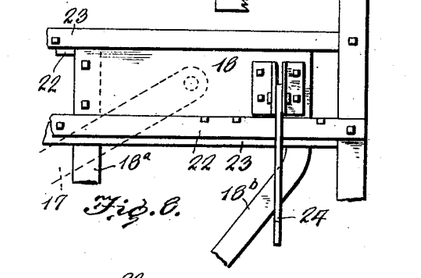
Figure 7:
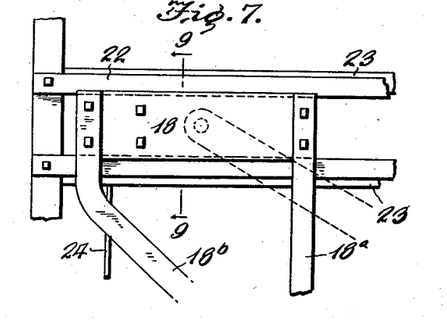
Figure 9:
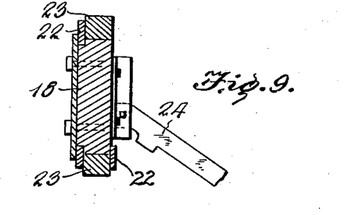
Fig. 9 is a detail sectional view taken on the line 9—9 of Fig. 7.

Referring to said drawings, in which the same reference characters or numerals are used to denote corresponding parts in different views, 1 denotes an upright frame structure having horizontal base members 2, which are supported at the front and rear thereof on runners 3, and 3ª, adapted to run in suitably prepared grooves for guiding the machine over the ice field as hereinafter described. 4 denotes the casing of a gasoline engine or motor mounted on a forwardly extended portion of the machine frame for imparting motion to the main driving shaft 5, by means of an endless belt 6 connecting a pulley 6ª on the engine crank-shaft with a relatively large pulley 5ᶜ (Figs. 1 and 2) on the shaft 5. This shaft has a sprocket wheel 5ª on one end connected by an endless belt or sprocket chain 7 with a sprocket wheel 7ª idling on a countershaft 7ᵇ (Fig. 4) which carries a drum 8 on which is wound a cable 9, the free end of which is to be secured to a fixture a suitable distance ahead or in advance of the machine for moving it over the ice field intermittently, or step by step, the required distance for cutting blocks of ice of a predetermined length. The shaft 5 has fixed thereon a beveled gear wheel 5ᵇ (Fig. 1) and has secured on its outer end a crank-arm or eccentric 10; the gear 5ᵇ being in mesh with a similar beveled gear 11ª fixed on a shaft 11. The shaft 11 is journaled in suitable bearings therefor secured to horizontal base members of the frame structure and has secured on its outer end a crank-arm or eccentric 12. The crank arm 10 is pivoted to the lower end of a vertically disposed connecting bar or rod 13 (Fig. 4), the upper end of which is pivoted to a substantially horizontally disposed vertically swinging lever 14, which is fulcrumed at one end, as at 14ª, to an upright member of the frame structure and has its other end pivoted, as at 14ᵇ, to an upright member or long shank 15ª of a longitudinal cutting blade 15, which, as shown, has a saw-toothed edge. The crank-arm 12 is pivoted to one end of a vertically disposed connecting bar or rod 16 (Fig. 2), the upper end of which is pivoted to a substantially horizontally disposed vertically swinging lever 17, which is fulcrumed at one end, as at 17ª, to a slidable block 18 mounted in a suitable guideway on the machine frame to permit lateral movement thereof and has its other end pivoted, as at 17ᵇ, to an upright member or long shank 19ª of a transverse cutting blade 19 of ordinary saw-toothed form.

Figures 2, 3:
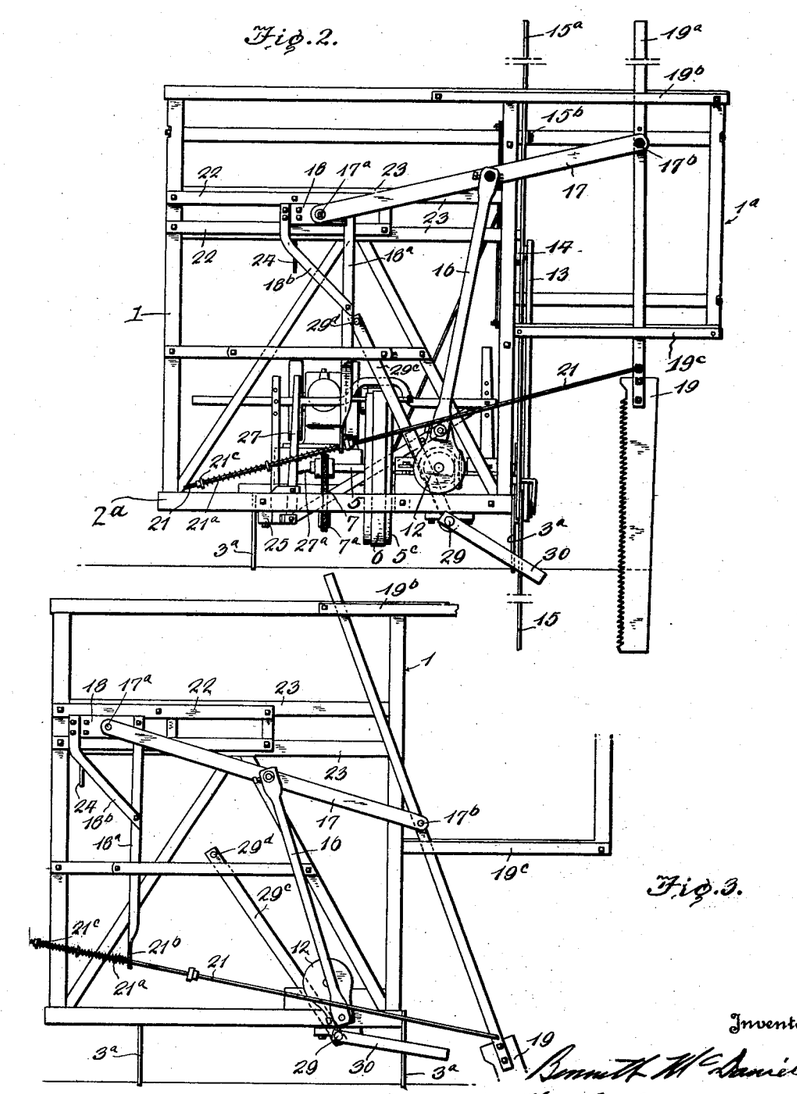
Fig. 2 is a rear end elevation of the machine, showing the cross-cut saw in its normal position.
Fig. 3 is a view similar to that shown in Fig. 2, showing the cross-cut saw in its initial cutting position with its cutting edge facing the outer edge of the ice field or a longitudinal strip to be cut into blocks.

The shank 15ª of the cutter blade 15 is fitted in suitable guides on the upright frame structure, as at 15ᵇ and 15ᶜ, permitting the shank to slide vertically and swing laterally on its pivotal connection with the swinging lever 14, so as to allow the saw-toothed blade 15 to move backwardly under the tension of a spring 20ª carried by a rod 20, and tending to resist backward movement of the blade. The rod 20 is pivoted at one end to the shank of the blade 15 and extends forwardly therefrom through a guide 20ᵇ on the machine frame which forms an abutment for one end of the spring 20ª, the other end of which bears against a collar or nut 20ᶜ screwed on the free end of the rod 20, so that the saw is permitted to swing backwardly under the tension of the spring into an inclined position as the machine moves forward a sufficient distance to advance the transverse or cross-cut saw 19 far enough to begin cutting off a block of ice of the desired length, whereupon the machine proper will momentarily come to rest and the cross-cut saw will cut off a block of ice while the longitudinal or strip-cutting saw is cutting its way through the ice by force of the recoil of the spring. When the cross-cut saw has done its work, the machine will be caused to move forward again under the pull of the cable as hereinafter described a distance equal to the length of another block, the strip-cutting saw having meanwhile reached a substantially vertical position, as shown in full lines in Fig. 4 of the drawings. The driving mechanism is adapted to impart a continuous reciprocating movement to both the strip-cutting saw and the cross-cut saw, but the cross-cut saw operates to cut only intermittently, while the strip-cutting has continuous cutting operation with the periodical forward movement of the machine under pull of the cable, each time bringing the machine to a point at which the cross-cut saw is to operate. From that point until the machine again moves forward, a continuance of its cutting action is effected by the recoil of the spring 20ª while the machine is momentarily standing still and the cross-cut saw is in action. When the machine moves forward, the cross-cut saw is thrown into an outward position as shown in Fig. 2, in order that it may not come into contact with the ice but may move forward through clear water a distance equal to the length of a block to be cut, whereupon it is brought again into contact to sever a block by force of the recoil of a spring acting thereon as hereinafter described.

Figures 1, 5, 6:
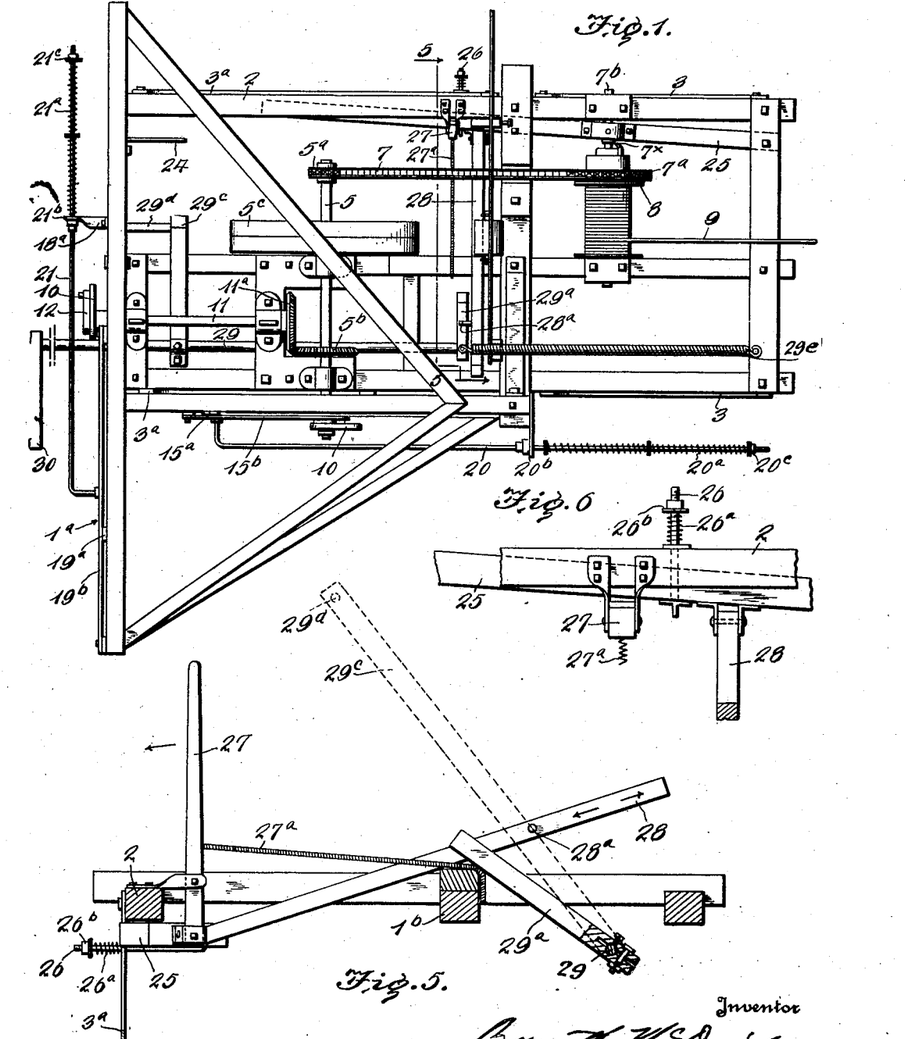
Fig. 1 is a plan view of an ice cutting machine embodying our invention; the driving engine being removed to expose the clutch mechanism thereunder.
Fig. 5 is a detail transverse sectional view taken on the line 5—5 of Fig. 1, looking in the direction of the arrows.
Fig. 6 is a fragmentary detail plan view of parts shown in Fig. 5, partly broken away.
Figure 10:
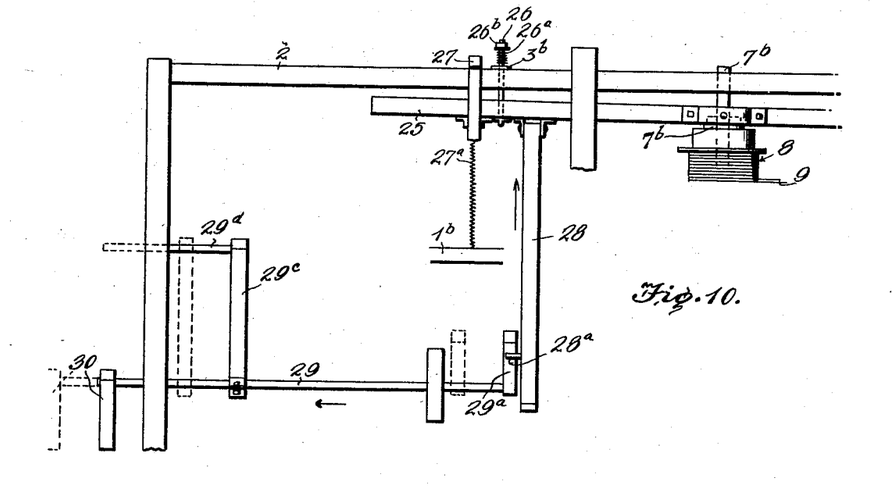
Fig. 10 is a fragmentary diagrammatic plan view of parts of the manually and mechanically operated clutch controlling means.

The saw blade 19 is arranged to present its cutting edge to the ice at an angle substantially at right angles to the blade 15, to adapt it to cut the strip of ice severed by the latter blade into blocks of such length as may be desired. The shank 19$^a$ of the saw 19 is vertically slidably fitted in suitable guides 19$^b$ and 19$^c$ on a lateral extension 1$^a$ of the upright frame structure so as to permit a vertically reciprocating movement of the saw and at the same time permit the saw to be swung backwardly on its pivotal connection with the swinging lever 17 toward one side of the machine into the inclined position shown in Fig. 3, against the pressure of a spring 21$^a$ carried by a rod 21 pivoted at one end to the shank of the saw blade 19 and extending therefrom laterally through an aperture or guide 21$^b$ at the lower end of a rod or bar 18$^a$ depending from the sliding block 18. The rod or bar 18$^a$ is held in an upright position by means of a brace 18$^b$, connecting it with the outer end of the sliding block and one end of the spring 21$^a$ bears against the lower end of said rod 18$^a$ while its other end bears against a nut or collar 21$^c$ screwed on the free end of the rod, so that when the block 18 is shoved or pulled outwardly to throw the saw into an inclined position against the resistance of the spring 21$^a$, the recoil of the spring will exert sufficient force to cause the saw with continuing reciprocation to cut a block of ice from the strip severed by the saw 15 and thereupon the operator restores the block 18 to its normal position. A suitable guide-way in which the sliding block is fitted is provided on the upright portion of the machine frame by means of metal strips 22, or the like, secured to horizontal bars 23 of the frame structure, so that the block may be moved laterally and outwardly by the operator, thereby throwing the saw into the inclined position shown in Fig. 3 of the drawings, through its connections with the sliding block. In the latter position of the saw its cutting edge is presented to the strip of ice severed by the saw 15 at a point determined by the distance the machine is moved while the saw is held in the inclined position under the tension of the spring acting thereon. For the purpose of shifting the block 18 from its innermost to its outermost position and thereby shifting the saw 19 into the inclined position shown in Fig. 3, the block has pivotally secured thereto as shown in Fig. 8 a manually operable lever 24 which may be grasped by the operator and raised to release it from the notch in the underlying metal bar and then pulled toward that side of the machine (to the left in Fig. 2) on which the operator is standing, thereby drawing upon the lever 17 and through its connections with the saw throwing the latter outwardly into clear water, and as the reciprocating movement of the saw is continued the retractile force or tension of the spring 21$^a$, will force the saw to cut its way through the strip of ice severed by the saw 15. Thereupon the operator moves the sliding block back to its normal position, so as to restore the saw to the position shown in Fig. 2, out of the line of contact with the ice as the machine is moved forward to position to cut off another block, whereupon the operator, by pulling the sliding block outwardly, again throws the saw into the inclined position of Fig. 3 for the next cross-cut. The sliding block may be held in a fixed position with the saw in either an upward or an inclined positioned by providing a series of notches in the lower metal bar 23 of the guideway in which the block is fitted, as shown in Fig. 8, so that in either the upright or inclined position of the saw the lever 24 may drop down into one of the notches for holding the sliding block stationary until released by the operator. In Fig. 3 of the drawings the sliding block is shown in the position it occupies when the cross-cut saw is ready to begin cutting action. When the cross cut is completed the operator moves the sliding block into the position shown in Fig. 2, thereby causing the lever 24 to engage the second notch and lock the cutting off saw out in open water so that the machine may move forward a predetermined distance equal to the length of a block to be cut, and thereupon the sliding block is again thrown into the position shown in Fig. 3 to enable the cross-cut saw to cut off another block of ice. In cutting blocks of ice of a predetermined length two notches only are necessary, but if desired additional notches may be provided into which the lever 24 may drop to hold the block stationary for cutting blocks of ice of different lengths. The drum shaft 7$^b$ has secured thereon a clutch 7$^x$, of any suitable construction (not forming per se any part of this invention), one member of which is actuated by a swinging lever 25 pivoted at one end to a lower frame bar and extending rearwardly therefrom and having secured thereto intermediate its ends a guide rod or bolt 26 which projects through a perforated plate or bracket 3$^b$ depending from a lower horizontal frame bar 2 and has thereon a spring 26$^a$ which bears at one end against said plate 3$^b$ and at the other end against a collar or nut 26$^b$ screwed on the bolt 26, so that the spring tends to force said lever 25 into position to hold the clutch member out of engagement with the other clutch member connecting with the aforesaid sprocket 7$^a$ on the drum shaft. For shifting the lever 26 to engage the clutch, a hand lever 27 is fulcrumed on a bracket projecting from the frame member 2 and has its short arm pivoted to the lever 25 so that when the long arm of the lever 27 is moved outwardly it will throw the free end of the lever 25 inwardly and thereby engage the clutch member carried by the lever 25 with the clutch member carried by the drum shaft. When the lever 27 is released by the operator, a spring 27ª acting thereon will restore the lever to normal position so that the clutch will disengage. When the clutch members are engaged, the continuously driven shaft 5 will cause the drum shaft to revolve sufficiently to advance the machine a distance equal to the length of a block of ice to be cut by the saw 19, whereupon, as the lever 27 is released, the machine will be brought again to a standstill while the saw 19 is cutting off a block of ice. An upwardly inclined rod or bar 28 pivoted at one end to the lever 25 extends therefrom over a lower frame bar 1ᵇ and carries a pin 28ª which is arranged normally in the path of movement of a swinging tappet arm 29ª fixed on a shaft 29, which is rockably secured in suitable bearings therefor on the machine frame and carries on its rear end at the back of the machine a swinging arm 30 which, in normal position, is raised above the surface of the ice, but is adapted to be thrown down into the position shown in Fig. 2, so that it may contact with the end of the strip of ice that is being cut by the longitudinal saw 15 as the machine is moved forward to bring the cross-cut saw into position to cut a block of ice. In the latter position said arm 30 acts as a trip drawing the shaft 29 rearwardly in its bearings as the machine moves forwardly to the extent indicated in dotted lines in Fig. 10 of the drawings, or an extent equal to the length of ice block to be cut, thereby releasing the bar 28 (by moving the arm 29ª away from pin 28ª) and permitting said bar to be returned to normal position by the retractile force or recoil of one or both of the springs 26ª and 27ª, acting, respectively, directly on the lever 25 and on its operating lever 27 to disengage the clutch and momentarily stop the forward movement of the machine. The shaft 29 and tappet arm or lever 29ª thereon may be restored to the full-line position shown in Fig. 10 by the recoil of a spring 29ᵉ connecting the tappet arm with a fixed part of the machine frame, as shown in Fig. 1. Fixed on the shaft 29 near the rear end of the machine is a lever 29ᶜ carrying at its upper or outer end a lateral pin or finger 29ᵈ, in position to be struck by the bar 18ª on movement of the slide 18 from the position shown in Fig. 3 to that shown in Fig. 2. This action swings the lever 29ᶜ and results in the stop arm 30 being lowered so that it may ride along the longitudinal edge of the body of ice to be cut, and in addition (through the arm 29ª acting on bar 28) throws the clutch into operative position to advance the entire machine. At a given point, namely, the last cross-cut of the saw 19, the stop arm 30 strikes the transverse edge of the next block to be cut, and stops, thereby effecting rearward sliding movement of the shaft 29, with levers 29ª and 29ᶜ so that the lever 28 will be freed to slide on the frame bar 1ᵇ under tension of the spring 26ª. This action releases the clutch and stops the forward movement of the machine. At this point the lever 24 is moved toward the operator (or to the left) to the position shown in Fig. 3, and consequently angling or inclining the saw 19 for contact with the ice in its reciprocating movement in cutting position.

Figure 11:
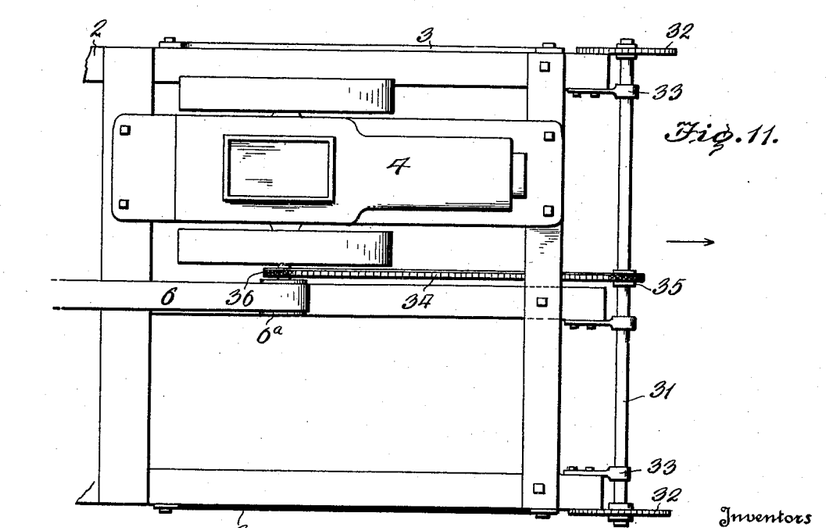
Fig. 11 is a fragmentary plan view of the front end portion of the machine, partly broken away, showing an attachment for cutting grooves in the surface of the ice field over which the machine is drawn or impelled, which will serve as guides for the runners, causing the machine to move straight ahead in cutting a strip of the desired width.

For the purpose of guiding the machine in a straight line across the ice field, we provide a grooving device at the front consisting of a shaft 31 carrying toothed disks 32, one at each side of the machine frame; said shaft being journaled in suitable bearings provided therefor by brackets 33 projecting forwardly from a lower or base member of the frame structure; said disks being adapted to cut grooves in the ice which will serve as guides for the runners 3 and 3ª as the machine is drawn across the ice field. The shaft 31 is driven by means of a sprocket chain 34, or the like, connecting a sprocket wheel 35 on the shaft with a sprocket wheel 36 on the motor shaft, so that as the machine moves forward rotary movement will be imparted to the disks 32, thus causing them to cut grooves in the ice to receive and guide the runners 3 and 3ª so that the machine may move in a straight line across or over the ice field.

It will be understood of course that various changes may be made in the details of construction and arrangement of parts without departing from the spirit and scope of our invention and therefore we do not desire to be limited in the appended claims to the specific construction and arrangement of parts illustrated and described.

Having thus described our invention, what we claim as new and desire to secure by Letters Patent of the United States is:

1. An ice cutting machine comprising in combination, a clutch controlled reeling means for drawing the machine forwardly along the surface of a body of ice, a reciprocating cutter arranged to cut a strip from the ice body as the machine moves forward, a reciprocating cutter arranged to cut blocks from the cut strip, in periods of momentary arrest of the machine, operating mechanism for continuously reciprocating said cutters, in upright and inclined positions and whether the machine is at rest or moving, and manual means for interrupting the cutting action of one of the cutters while simultaneously bringing the other cutter into play.

2. An ice cutting machine movable along the surface of a body of ice and comprising a vertically disposed reciprocable cutter arranged to present its toothed cutting edge to the ice in the direction of its movement for cutting strips therefrom, a vertically disposed reciprocable cutter arranged to cut the strips into blocks transversely to the first named cutter, means including a driven shaft and eccentries for imparting a continuous reciprocating movement to each of said cutters, and means including a shifting sliding block for intermittently interrupting the cutting action of one of the cutters at the will of the operator and to bring the other cutter into play.

3. In an ice cutting machine having a clutch controlled reeling means for moving it along the surface of a body of ice, a pair of reciprocating cutters, one arranged to cut a strip of ice extending longitudinally in the direction of movement of the machine and the other disposed in a vertical plane substantially at right angles to the first cutter so as to cut the strip transversely of the direction of machine movement into blocks of a predetermined length, means including driven shafts, eccentries and connecting levers for imparting a continuous reciprocating movement to said cutters, and means including a shifting slide-block controllable by the operator and effecting operation of the aforesaid clutch for intermitently interrupting the cutting action of one of the cutters while simultaneously bringing the other into play.

4. The combination, in an ice cutting machine having a continuously driven reciprocating saw for cutting strips of ice from an ice field over which the machine is drawn, a continuously driven reciprocating saw arranged to cut transversely to the first named saw for cutting the strip into blocks, mechanism including driven shafts, eccentries and connecting levers for imparting a continuous reciprocating movement to said saws, and means including a manually shifted slide-block for intermittently interrupting the cutting action of one of the saws while causing the other saw to be brought into cutting action.

5. In an ice cutting machine having a reciprocating cutter presenting its cutting edge to the ice in the direction of the machine movement for cutting the ice into strips, a reciprocating cutter arranged to present its cutting edge to the ice at an angle to the cutting line of the first cutter for cutting the ice strips transversely into blocks, means for imparting a continuous reciprocating movement to said cutters, means including a clutch-controlled reeling device for drawing the machine forwardly along an ice field and trip mechanism effecting operation of the clutch for automatically interrupting the forward movement of the machine after advancing a predetermined extent equal to the desired lengths of ice blocks, thereby interrupting the cutting action of the first cuter and permitting the second one to be brought into cutting action.

6. An ice cutting machine having a continuously driven reciprocating saw for cutting strips of ice from an ice field over which the machine is drawn, and a continuously driven reciprocating saw arranged to cut transversely to the first named saw for cutting blocks of predetermined length from the strip cut by the strip cutting saw, means including a reeling device for drawing the machine forwardly with the strip cutting saw in cutting action, means including a sliding shaft and swinging arm members effecting automatic tripping of said forward drawing means when the machine has advanced a predetermined extent, and means including a shifting block for throwing the transverse cutting saw into cutting action when the machine is brought to rest.

7. An ice cutting machine having a pair of vertically reciprocable saw blades each having a long shank movably supported in guides on the machine frame so as to permit a backward swinging movement of one blade in the direction in which the machine is drawn and a backward swinging movement of the other blade transversely of the line of machine movement, one of said blades being arranged to cut a strip of ice from said body as the machine is moved forward and the other being arranged to cut a block of ice from said strip while the machine is momentarily brought to rest, a clutch-controlled reeling device for drawing the machine forwardly with the strip-cutting blade in cutting action, means engaging behind the cut ice strip and effecting operation of the clutch for automatically tripping said reeling device when the machine has advanced a predetermined distance, means controlled by the operator for throwing the block-cutting blade into cutting action when the machine is brought to rest and means associated with each of the cutting blades serving to yieldingly resist backward movement and to assist the cutting operation thereof as they are brought alternately into play.

8. In an ice cutting machine movable along the surface of a body of ice; a pair of vertically slidably movable saw-blades, one arranged to cut a strip of ice extending longitudinally in the direction of movement of the machine and the other arranged to cut the strip transversely into blocks of predetermined lengths, means including a manually shifted slide-block for throwing the transverse cutting blade out of cutting position while the machine is moving forward and for bringing it into cutting position when the machine is brought momentarily to rest without interrupting its slide movement, means for drawing the machine forwardly with the strip-cutting blade in cutting action on the ice, and means tripping said forward drawing means for bringing the machine to rest in successive stages of advance a predetermined distance equal to the desired lengths of blocks.

9. An ice cutting machine comprising in combination, means for impelling the machine over the surface of a body of ice; means for arresting the machine in successive stages of advance a predetermined distance equal to the length of blocks to be cut; a pivotally supported reciprocating cutter arranged to swing forward and back on its pivotal support; means yieldingly resisting backward movement of the cutter, said resisting means serving to store cutter operating power while the machine is momentarily at rest; and mechanism for imparting to the cutter a continuous reciprocating movement for cutting off a strip of ice as the machine is moved forward in successive stages over the ice field.

10. An ice-cutting machine comprising in combination, means for impelling the machine over the surface of a body of ice and means controlling the same for arresting the machine in successive stages of advance a predetermined distance equal to the length of blocks to be cut; a reciprocating cutter arranged to cut a strip of ice from the body thereof over which the machine is moved; a reciprocating cutter arranged to cut transversely to the first named cutter when the machine is arrested so as to cut the strip into blocks; means for imparting continuous reciprocating movement to the two cutters; and manually actuated means including a shift-block for throwing the transverse cutter into cutting action when the machine is arrested.

11. An ice-cutting machine comprising in combination, means for impelling the machine over the surface of a body of ice; means controlling the same for arresting the machine in successive stages of advance a predetermined distance equal to the length of blocks to be cut; a reciprocating cutter arranged to cut a strip from the body of the ice as the machine is moved thereover; a cross-cut reciprocating cutter arranged to act in a plane angular to the first named cutter for cutting the strip into blocks; means including eccentric-driven levers for imparting continuous reciprocating movement to said cutters; and means including a manually shifted slide-block for throwing the cross-cut saw out of cutting position during the forward movement of the machine and into cutting position when the machine is brought to rest.

12. An ice-cutting machine comprising in combination, means for impelling the machine forwardly over a body of ice; means controlling and tripping said impelling means to arrest the machine in successive stages stages of advance a predetermined distance equal to the desired length of blocks to be cut; a reciprocating saw adapted to cut the ice into strips as the machine is moved forward thereover, said saw being vertically movably supported on the machine frame so as to adapt it to swing backwardly into an inclined position as the machine moves forward; means for imparting a continuous reciprocating movement to said saw; and means for yieldingly resisting backward movement thereof, said means serving also to store power utilized in the saw cutting action.

13. An ice-cutting machine comprising in combination, means for impelling the machine forwardly over a body of ice; means controlling and means tripping said impelling means to arrest the machine in successive stages of advance a predetermined distance equal to the length of blocks to be cut; a plurality of reciprocating saws, one arranged to cut a strip of ice as the machine is moved forward and another arranged to cut the strip transversely into blocks when the machine is momentarily arrested, each of said saws being vertically movably supported on the machine frame so as to permit it to swing backward into an inclined cutting position; means including eccentric-driven bars for imparting continuous reciprocating movement to said saws; and means associated with each saw for yieldingly resisting backward movement thereof, said last-mentioned means serving also to assist the saw cutting actions and to hold them down to their work.

14. An ice-cutting machine comprising in combination, a continuously driven reciprocating saw for cutting strips of ice from an ice field over which the machine is drawn; a continuously driven reciprocating saw arranged to cut the strips transversely into blocks as the machine is momentarily arrested; means including a manually shifted slide-block for throwing the transverse cutting saw into cutting position when the machine is at rest and for throwing it out of cutting position when the machine is moving; a reeling device for drawing the machine forwardly over the ice field; and means including an element engaging behind the cut strips of ice for tripping said reeling device to arrest the machine in successive stages of advance a predetermined distance equal to the length of blocks to be cut.

15. In an ice-cutting machine embodying a frame structure and power-means, means for impelling the machine along a body of ice; means for tripping said impelling means to arrest the machine in successive stages of advance a predetermined distance equal to the lengths of blocks to be cut; a pair of reciprocating saws, one adapted to cut a strip from the body of ice as the machine is moved forward thereover and the other adapted to cut the strips transversely into blocks as the machine is brought to rest; means including a manually shifted slide-block for throwing the transverse cutting saw into cutting position when the machine is at rest and for throwing it out of cutting position during movement of the machine; means for imparting continuous reciprocating movement to each of the saws; and means associated with each saw for yieldingly resisting rearward movement thereof and holding it under tension in cutting action.

In testimony whereof we affix our signatures.

BENNETT McDANIELS.
WILLIAM C. BROOKS.